(12) United States Patent
Ohta et al.

(10) Patent No.: US 7,583,462 B2
(45) Date of Patent: Sep. 1, 2009

(54) HEAD AMPLIFIER WITH A HEAT CONTROLLER

(75) Inventors: Naoki Ohta, Tokyo (JP); Tetsuya Kuwashima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/851,043

(22) Filed: Sep. 6, 2007

(65) Prior Publication Data

US 2008/0084628 A1 Apr. 10, 2008

(30) Foreign Application Priority Data

Oct. 4, 2006 (JP) ............................. 2006-272846

(51) Int. Cl.
*G11B 5/09* (2006.01)
*G11B 21/02* (2006.01)

(52) U.S. Cl. .......................................... 360/59; 360/75

(58) Field of Classification Search ....................... None
See application file for complete search history.

(56) References Cited

U.S. PATENT DOCUMENTS

| | | | |
|---|---|---|---|
| 6,972,919 B2 | 12/2005 | Suk | |
| 7,023,647 B2 * | 4/2006 | Bloodworth et al. | 360/75 |
| 7,068,458 B2 * | 6/2006 | Huang et al. | 360/75 |
| 7,239,470 B2 * | 7/2007 | Takahashi et al. | 360/75 |
| 7,375,912 B2 * | 5/2008 | Brannon et al. | 360/75 |
| 7,382,562 B2 * | 6/2008 | Emo et al. | 360/46 |
| 2006/0039077 A1 | 2/2006 | Xu et al. | |

FOREIGN PATENT DOCUMENTS

JP A-2004-259323 9/2004

* cited by examiner

*Primary Examiner*—K. Wong
(74) *Attorney, Agent, or Firm*—Oliff & Berridge, PLC

(57) ABSTRACT

Timely and proper flying height adjustment is achieved using a controller, which is designed for a magnetic recording and reproducing apparatus that does not use a magnetic head having a heating element for flying height adjustment without any modification. A head amplifier includes a write amplifier for applying a write current to a write head element, a read amplifier for amplifying a read voltage output from a read head element and outputting a read signal, a heating element driver for applying a heat generating current to at least one heating element for adjusting a flying height, and a heat controller for controlling the heating element driver.

11 Claims, 7 Drawing Sheets

HEAD AMPLIFIER WITH A HEAT CONTROLLER

PRIORITY CLAIM

This application claims priority from Japanese patent application No. 2006-272846 filed on Oct. 4, 2006, which is incorporated herein by reference.

BACKGROUND OF THE INVENTION

1. Field of the Invention

The present invention relates to a head amplifier for a head that magnetically writes and reads data signals, a recording and reproducing control circuit including the head amplifier, and a magnetic recording and reproducing apparatus including the recording and reproducing control circuit, and, in particular, to a head amplifier for a head including a heating element for adjusting the flying height of the head with respect to a magnetic recording medium.

2. Description of the Related Art

Thin-film magnetic heads included in magnetic disk apparatuses, which are typical magnetic recording and reproducing apparatuses, hydrodynamically fly above rotating magnetic disks with predetermined gaps (flying heights), while in writing and reading signals. A thin-film magnetic head, in this flying state, uses an electromagnetic coil element, which functions as a write head element, to apply a magnetic field to a magnetic disk to write a data signal, and uses a magnetoresistive effect (MR) element, which functions as a read head element, to sense a magnetic field from the magnetic disk to read a data signal.

The track widths of thin-film magnetic heads are significantly decreasing along with increasing recording densities of the magnetic disk apparatuses, which are increasing in capacity and decreasing in size in these years. In order to avoid reduction in writing and recording capabilities that can result from the decreased track widths, the flying heights of the recent magnetic disk apparatuses have been reduced. Actually, the flying heights are set to approximately 10 nm or less.

Such an ultra-low flying height must be stably controlled in order to prevent thermal asperities and crashes, thereby maintaining good write and read characteristics. As disclosed in U.S. Pat. No. 6,972,919B, JP2004-259323A, and US2006/0039077A, a technique has been developed and come to attention recently that provides a heating element in a thin-film magnetic head and uses heat from the heating element to protrude an end of the thin-film magnetic head toward the surface of a magnetic disk, thereby adjusting the flying height.

In order to heat the heating element provided in the thin-film magnetic head, a control circuit that controls heat generation of the heating element is required. As described in JP2004-259323A, the control function of the heating element has been implemented in a hard disk controller (HDC), which controls recording and reproducing.

With this configuration, a lead wire for applying a heat generating current to the heating element is required between the HDC and the magnetic head, in addition to signal lines for an electromagnetic coil element and an MR element provided between the HDC and the magnetic head via a head amplifier. These signal lines and lead wire are typically attached to a head gimbal assembly (HGA). JP2004-259323A discloses a technique that decreases the number of these signal lines and lead wires (transmission lines) to reduce the rigidity of the transmission lines so that nearly only the load set in the HGA itself is applied and the influence of the rigidity of the transmission lines on the flying control is reduced.

However, the conventional heat generation control method described above has a problem that the new function must be added to the HDC.

As has been described above, the HDC, used in a magnetic disk apparatus including a head that has a heating element for flying height adjustment, has the function of adjusting power supply to the heating element. FIG. 7 is a circuit block diagram showing a conventional control circuit of a magnetic recording and reproducing apparatus including a heating element for flying height adjustment. Referring to FIG. 7, an HDC 71 communicates data signals with an amplifier 700 for a write head element and an amplifier 701 for a read head element through a read and write (R/W) channel. Moreover, the HDC 71 sends a control signal to a driver 702, which applies a heat generating current to a heating element, to control heat generation.

From this fact, it can be seen that an HDC that has been used in a magnetic disk apparatus including a head without a heating element cannot be used as the HDC 71 without modification. That is, there has been an inconvenience that, in the present state of the art, different HDCs need to be provided to control thin-film magnetic heads with and without heating elements.

Further, due to a distance between the HDC and the head amplifier, the heat generation delays, and possibly caused the difficulty of the timely flying height adjustment.

SUMMARY OF THE INVENTION

Therefore, an object of the present invention is to achieve a timely and proper flying height adjustment with a HDC, which is designed for a magnetic recording and reproducing apparatus using a magnetic head without a heating element for flying height adjustment.

According to the present invention, there is provided a head amplifier, which includes a write amplifier for applying a write current to a write head element, a read amplifier for amplifying a read voltage output from a read head element and outputting a read signal, a heating element driver for applying a heat generating current to at least one heating element for adjusting a flying height during a write and/or a read operation, and a heat controller for controlling the heating element driver.

The head amplifier according to the present invention includes a heat controller, and the heating element, to which a proper current for heat generation is applied as appropriate under the control of the heat controller, generates a required amount of heat. As a result, the flying height of a thin-film magnetic head during a write and/or a read operation can be reliably adjusted. A HDC connected to the head amplifier may be conventional one used in a magnetic disk apparatus including a head without heating element for flying height adjustment. Furthermore, the entire circuitry that controls the heating element is provided between the head and the head amplifier accordingly. Therefore, the signal delay is small compared to a case where heat generation is controlled by the HDC, and the flying height can be adjusted in a timely manner.

That is, according to the present invention, a HDC for a magnetic recording and reproducing apparatus that does not have a heating element for flying height adjustment can be used, without any modification, to achieve timely and proper flying height adjustment.

In the head amplifier according to the present invention, the heat controller preferably receives the read signal from the read amplifier and adjusts the heat generating current by controlling the heating element driver on the basis of the read signal.

In the head amplifier according to the present invention, the heat controller preferably includes a memory unit which stores a state variable table, a state variable managing unit for retrieving a required value from the state variable table, an output comparing unit for comparing the read signal with a corresponding value in the state variable table and outputting a comparing result, and a drive control unit for outputting a control signal which controls the heating element driver on the basis of the comparing result. The state variable managing unit preferably calibrates the state variable table on the basis of the comparing result from the output comparing unit.

Because the state variable managing unit calibrates the state variable table as described above, it is possible to adapt to changes of relationship between a flying height (the amount of protrusion) and a required amount of heat generating current, and an appropriate flying height can be stably provided during a write and/or a read operation. Here, changes of relationship may be caused by changes of the apparatus ambient, for example changes in ambient temperature or atmospheric pressure or aging.

In the head amplifier according to the present invention, the state variable managing unit preferably reads a corresponding value from the state variable table based on a write signal input into the write amplifier.

By using the write signal for the control as described above, a precise flying height adjustment that takes into consideration of a protrusion caused by a write current can be achieved with a HDC designed for a magnetic recording and reproducing apparatus that does not include a heating element for flying height adjustment.

Furthermore, preferably the head amplifier according to the present invention further includes a sensor amplifier for amplifying a sensor signal from an ambient sensor element provided outside the head amplifier and outputting a sensor signal to the state variable managing unit, and the state variable managing unit reads a corresponding value from the state variable table in accordance with the sensor signal.

By using the sensor signal for the control in this way, a precise flying height adjustment that takes into consideration of changes in flying height due to ambient conditions can be achieved with a controller designed for use in a magnetic recording and reproducing apparatus that does not include a heating element for flying height adjustment.

Further, in the head amplifier according to the present invention, preferably the memory unit includes a non-volatile memory such as a flash memory, EEPROM, or MRAM.

Furthermore, preferably the head amplifier according to the present invention further includes a contact detecting unit for detecting a contact of a head with a magnetic recording medium on the basis of a read signal received from the read amplifier and outputting a detection signal indicating the detection of the contact to the heat controller, and the heat controller adjusts the heat generating current by controlling the heating element driver based on the detection signal.

By providing the contact detecting unit described above, a touchdown operation for checking and adjusting the flying height can be reliably achieved in a control circuit that uses a HDC designed for use in a magnetic recording and reproducing apparatus that does not use a heating element for flying height adjustment. Furthermore, an accidental contact or crash of a head with the surface of a magnetic recording medium can be detected and appropriate measures can be taken.

According to the present invention, there is also provided a recording and reproducing control circuit, which includes the head amplifier described above and a hard disk controller for providing a write signal to the head amplifier and receiving a read signal from the head amplifier.

According to the present invention, there is also provided a magnetic recording and reproducing apparatus, which includes the recording and reproducing control circuit described above, at least one head gimbal assembly, and at least one magnetic recording medium. Each head gimbal assembly includes a thin-film magnetic head having a write head element which writes a data to a magnetic recording medium, a read head element which reads a data from a magnetic recording medium, and at least one heating element for adjusting a flying height during a write and/or a read operation; a supporting mechanism for supporting the thin-film magnetic head; signal lines for the write head element and the read head element; and a lead wire for supplying a heat generating current to the at least one heating element.

In the magnetic recording and reproducing apparatus according to the present invention, the head amplifier is preferably attached to the supporting mechanism.

Embodiments for carrying out the present invention will be described below in detail with reference to the accompanying drawings. The same or similar elements are labeled with the same reference numerals throughout the drawings. For clarity of the drawings, sizes in a component and between components in the drawings are not drawn to scale.

DETAILED DESCRIPTION OF THE INVENTION

Figure 1:
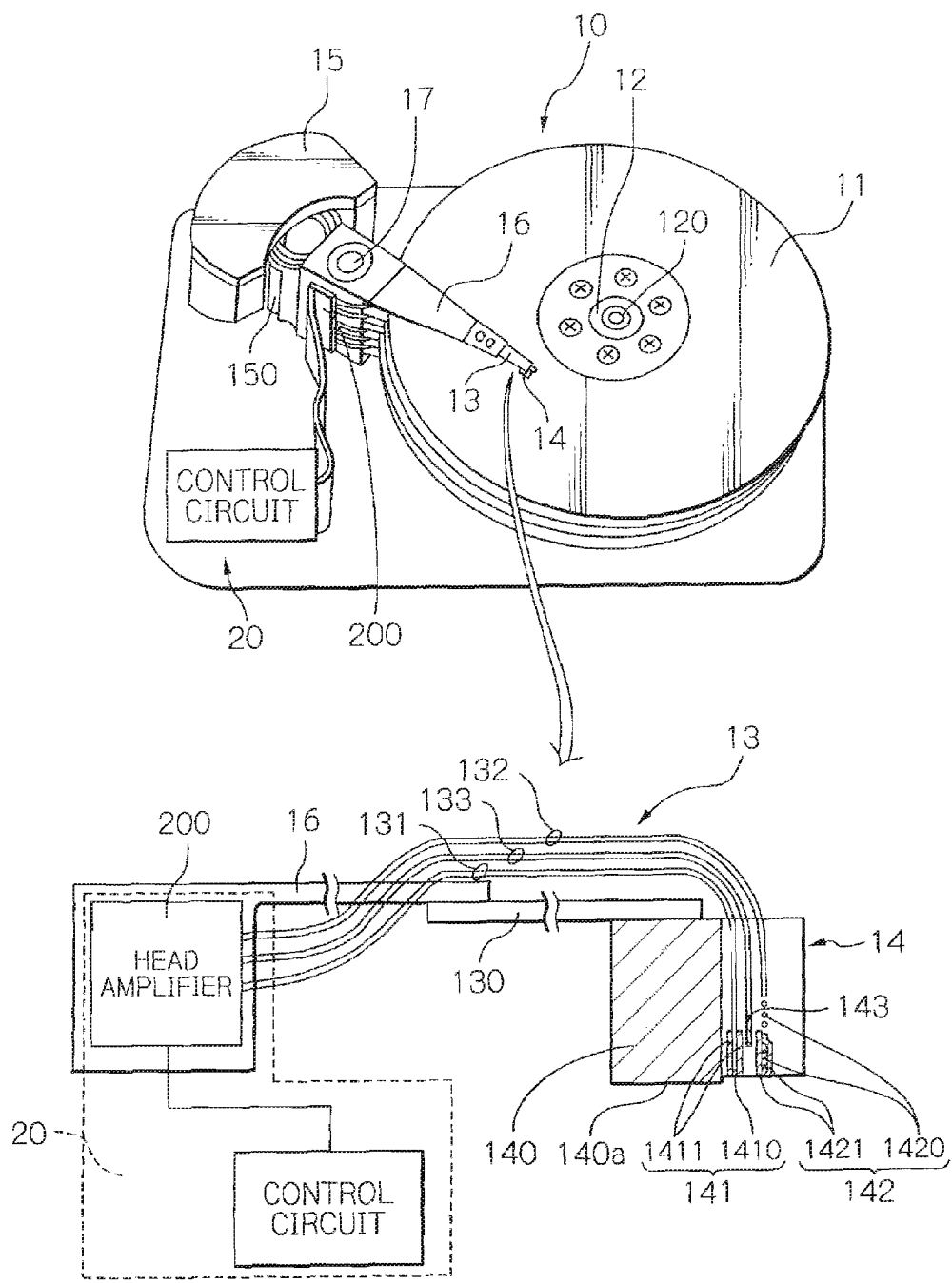
FIG. 1 is a perspective view schematically showing a configuration of the main part of a magnetic recording and reproducing apparatus according to one embodiment of the present invention.

FIG. 1 is a perspective view schematically showing a configuration of the main part of a magnetic recording and reproducing apparatus according to one embodiment of the present invention.

Shown in FIG. 1 is a magnetic disk apparatus 10, which is a magnetic recording and reproducing apparatus. Reference numeral 11 denotes magnetic disks which are multiple magnetic recording media that rotate about the spindle 120 of a spindle motor 12, reference numeral 13 denotes an HGA for positioning a thin-film magnetic head (slider) 14, which writes and reads a data signal on a magnetic disk 11, to properly face the surface of the magnetic disk 11, reference numeral 15 denotes an assembly carriage device for positioning the thin-film magnetic head 14 above a track of the magnetic disk 11, and reference numeral 20 denotes a recording/reproducing and flying height control circuit for controlling write and read operations of the thin-film magnetic head 14 and also controlling heat generating operation of a heating element provided in the thin-film magnetic head 14 for flying height adjustment.

Provided in the assembly carriage device 15 is a voice coil motor (VCM) 150, to which multiple drive arms 16 are attached. The drive arms 16 are capable of angular-pivoting about a pivot bearing axis 17 by the VCM 150 and are stacked along the pivot bearing axis 17. The HGA 13 is attached to an end of each drive arm 16. Each number of magnetic disks 11, drive arms 16, and HGAs 13 may be one.

Also referring to FIG. 1, each thin-film magnetic head 14 includes an MR element 141 which is formed on an element formation surface of a slider substrate 140, an electromagnetic coil element 142 and a heating element 143. The MR element 141 functions as a read head element for reading a data signal, the electromagnetic coil element 142 functions as a write head element for writing a data signal, and the heating element 143 heats to protrude an air bearing surface (ABS) 140a of the MR element 141 and the electromagnetic coil element 142 to adjust the flying height of the thin-film magnetic head 14 with respect to the magnetic disk 11.

One end of each of the MR element 141 and the electromagnetic coil element 142 reaches the end surface, which is the ABS 140a. The end of each of these elements faces the magnetic disk 11 to sense a magnetic field to read a data signal and to apply a magnetic field to write a data signal as will be described later.

The MR element 141 includes an MR multilayer 1410 and upper and lower shield layers 1411 which sandwich the MR multilayer 1410. The MR multilayer 1410 is for example a Current-In-Plain (CIP) Giant Magnetoresistive (GMR) multilayer film, a Current-Perpendicular-to-Plain (CPP) GMR multilayer film, or a Tunnel Magnetoresistive (TMR) multilayer film, and senses a magnetic field from the magnetic disk 11 with an extremely high sensitivity. The upper and lower shield layers 1411 prevent the MR multilayer 1410 from being affected by an external magnetic field, which is noise.

The electromagnetic coil element 142, which may be designed for longitudinal magnetic recording or perpendicular magnetic recording, includes upper and lower magnetic pole layers 1421 and a write coil 1420 formed so that its one turn passes at least between the upper and lower magnetic pole layers 1421. The write coil 1420 is electrically insulated from the upper and lower magnetic pole layers 1421. The upper and lower magnetic pole layers 1421 act as a guide for a magnetic flux generated when a write current is applied to the write coil 1420. The upper and lower magnetic pole layers 1421 sandwich a non-magnetic layer at the end on the ABS 140a side to form a gap. When a write current is applied, a write magnetic field is generated near the gap for writing to the magnetic disk 11.

The heating element 143 is an element for adjusting the flying height of the thin-film magnetic head 14 with respect to the magnetic disk 11, and generates heat when a current is applied to the element. The MR element 141 and the electro magnetic coil element 142 thermally expands or is pushed by thermal expansion of the material surrounding the elements due to heat from the heating element 143 to protrude toward the surface of the disk 11 in such a manner that the end surface on the ABS side is heaved. By controlling the protrusion by the amount of electric current applied to the heating element 143, the flying height can be adjusted.

While the heating element 143 is provided between the MR element 141 and the electromagnetic coil element 142 in FIG. 1, the position is not limited to this. For example, the heating element 143 may be provided to rearward of the MR element 141 and the electromagnetic coil element 142, viewed from the ABS 140a.

The heating element 143 may be a conducting line in the shape of a rectangular wave snaked in a given plain, or may be a conducting line in the shape of a straight line, letter U, or spiral. The conducting line of the heating element 143 may be made of a metal such as NiCu, NiCr, Ta, W, Ti, Cu, Au, or NiFe, or an alloy of any of these metals.

Also referring to FIG. 1, the HGA 13 includes the thin-film magnetic head 14, a suspension 130, which is a mechanism supporting the thin-film magnetic head 14, a signal line 131 for reading a read voltage output from the MR element 141 during a read of data signal, a signal line 132 for providing a write current to the electromagnetic coil element 142 during a write of a data signal, and a lead wire 133 for providing a heat generating current to the heating element 143 during a write and/or a read operations.

The signal lines 131 and 132 and the lead wire 133 electrically connect the MR element 141, the magnetic coil element 142, and the heating element 143, respectively, to a head amplifier 200. The head amplifier 200 is a part of the recording/reproducing and flying height control circuit 20 but is attached to the drive arm 16. This provision is made to reduce the distance between the head amplifier 200 and the thin-film magnetic head 14 to reduce the wiring inductance between them, so as to prevent an increase in the rise time and fall time of a write current and the like, thereby increasing transfer rate of a data signal. The head amplifier 200 may be attached to a portion of the assembly carriage device 15 or attached to the suspension 130.

Two signal lines 131 and 132 and a single lead wire 133 associated with one thin-film magnetic head 14 (HGA 13) are connected to the head amplifier 200 in FIG. 1. However, if the apparatus includes multiple heads (HGAs), the signal lines and lead wires from the heads (HGAs) may be collectively connected to the head amplifier.

Figure 2:
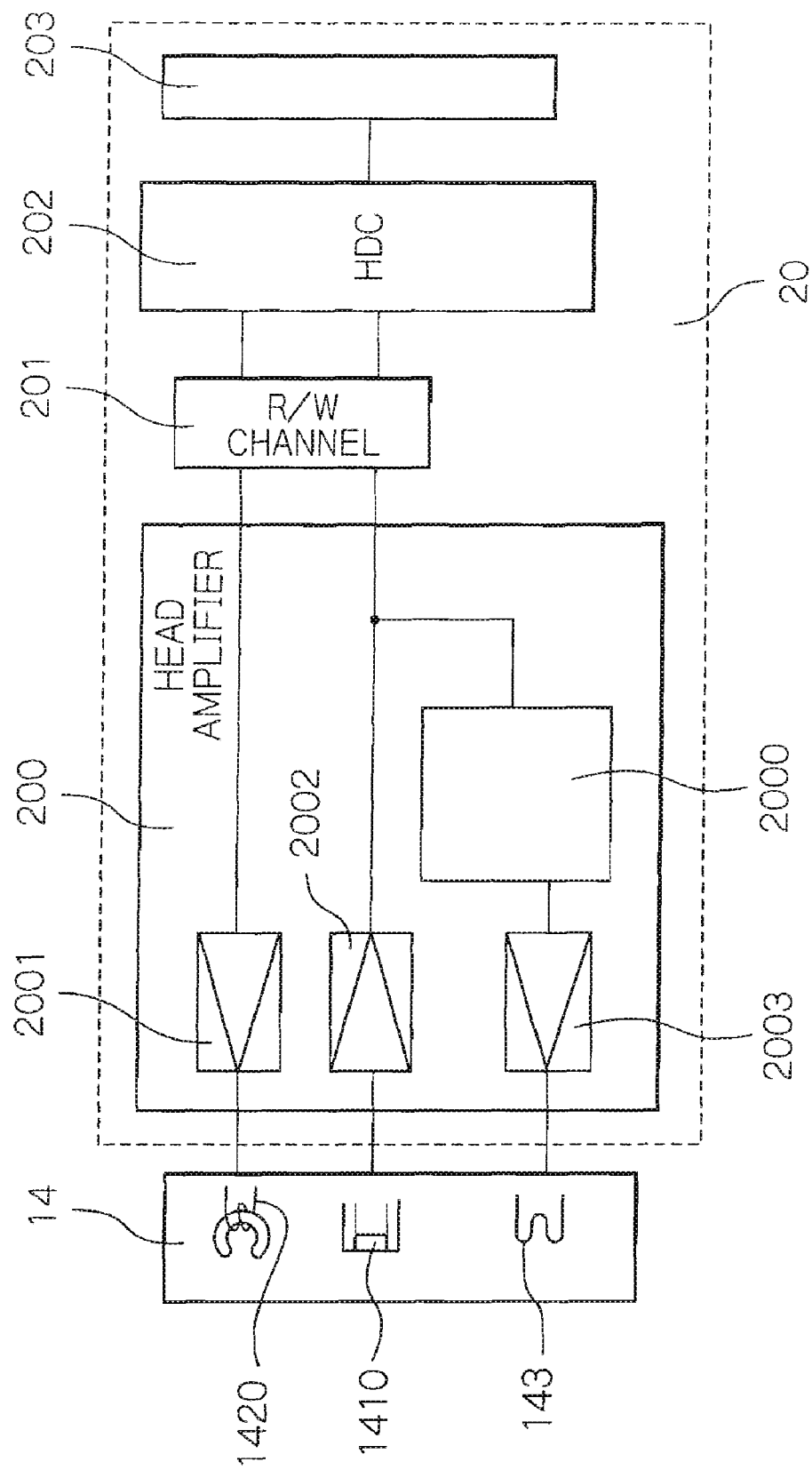
FIG. 2 is a circuit block diagram showing a head amplifier according to a first embodiment of the present invention.

FIG. 2 is a circuit block diagram showing a head amplifier according to a first embodiment of the present invention.

Referring to FIG. 2, the head amplifier 200 is one component of a recording/reproducing and flying height control circuit 20, which also includes a read/write (R/W) channel 201, an HDC 202, and an interface 203. The R/W channel 201 code-modulates a data signal received from the HDC 202 into a write signal and outputs the write signal to the head amplifier 200, and, on the other hand, code-demodulates a read signal output from the head amplifier 200 into a data signal and outputs the data signal to the HDC 202.

The HDC 202 is conventional one designed for use in magnetic disk apparatuses that includes a magnetic head without a heating element for flying height adjustment. That is, the HDC 202 adds an error correction code to a data signal it received from an external host system through the interface 203 and outputs the data signal to the R/W channel 201, and, on the other hand, applies error correction to a data signal received from the R/W channel 201 and sends it to the external host system through the interface 203. The HDC 202 may further include the functions of controlling buffering of data signals and controlling the interface 203.

The head amplifier 200 includes a write amplifier 2001, a read amplifier 2002, a heating element driver 2003, and a heat controller 2000.

The write amplifier 2001 amplifies a write signal from the R/W channel 201 to form a write current and applying the write current to a write coil 1420 of an electromagnetic coil element 142. The read amplifier 2002 amplifies a read voltage output from an MR multilayer 1410 of an MR element 141 to form a read signal and outputs it to the R/W channel 201. The heating element driver 2003 applies a heat generating current to a heating element 143.

The heat controller 2000 controls the heating element driver 2003 on the basis of a read signal output from the read amplifier 2002 to adjust a heat generating current output from the heating element driver 2003. In the present embodiment, an output line from the read amplifier 2002 is connected to the heat controller 2000, which is connected to the heating element driver 2003. The heat controller 2000 measures the amplitude of the read signal it received, estimates the flying height at that point in time from the measured amplitude, and sends a control signal to the heating element driver 2003 for adjusting a heat generating current to the heating element 143 for correcting the flying height to a desired value.

The head amplifier 200 includes the heat controller 2000 as described above. Under the control of the heat controller 2000, an appropriate heat generating current is applied to the heating element 143 to cause the heating element 143 to perform an operation for generating a required amount of heat. As a result, the flying height of the thin-film magnetic head during a write and/or a read operation is reliably adjusted. The HDC 202 is not at all involved in heat generation of the heating element 143. Therefore, the HDC 202 can be conventional one that is used in magnetic disk apparatuses having a head without a heating element for flying height adjustment. Furthermore, because the entire circuitry that controls the heating element 143 is provided between the thin-film magnetic head 14 (heating element 143) and the head amplifier 200, a signal delay is small and the flying height can be adjusted in a timely manner as compared with a case where the heating element 143 is controlled by the HOC.

From the foregoing, it can be appreciated that, according to the present invention, a HDC designed for magnetic recording and reproducing apparatus, which uses a head without a heating element for flying height adjustment, can be used without any modification, to achieve timely and proper flying height adjustment.

The head amplifier 200 in FIG. 2 has a circuit configuration for one thin-film magnetic head 14 connected. If multiple heads are connected, a number of write amplifiers, read amplifiers, heating element drivers, and a heat controller corresponding to the configuration and the number of the heads connected may be provided.

Figure 3:
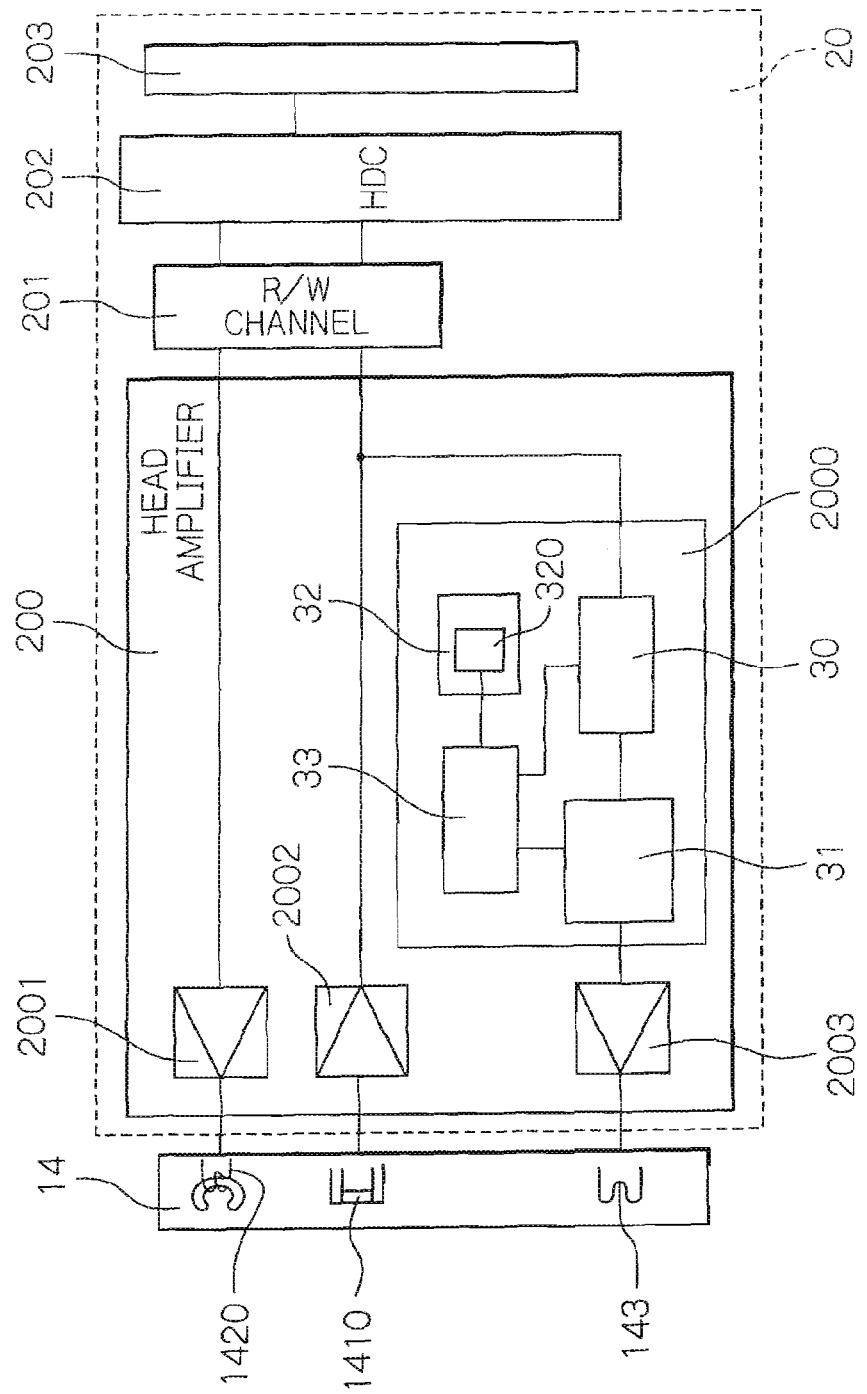
FIG. 3 is a circuit block diagram showing a configuration of a heat controller according to one embodiment.

FIG. 3 is a circuit block diagram showing a configuration of a heat controller 2000 according to one embodiment.

Referring to FIG. 3, the heat controller 2000 includes a output comparing unit 30 which receives a read signal and performs comparison, a drive control unit 31 which receives the result of the comparison from the output comparing unit 30 and outputs a control signal to a heating element driver 2003, a memory unit 32 storing a state variable table 320, and a state variable managing unit 33 which mediates between the memory unit 32 and the output comparing unit 30 and manages data values in the state variable table 320.

The output comparing unit 30 monitors a read signal output from the read amplifier 2002, measures the amplitude of the received read signal, compares the amplitude with a data value in the state variable table 320 that is associated with the read signal, and outputs a result of the comparison such as a difference. The state variable managing unit 33 retrieves a required data value from the state variable table 320 and sending the data value to the output comparing unit 30.

The state variables contained in the state variable table 32 are information such as information indicating the relationship of a amount of protrusion and a read signal with a required amount of heat generating current for each write/read operations, and information indicating a state (initial value) in which the heating element 143 is not driven. When the state variable managing unit 33 is requested to provide a data value in the state variable table 320 by the output comparing unit 30, the state variable managing unit 33 receives information about the heat generating current value at the present time from the drive control unit 31, retrieves the associated read signal value from the state variable table 320, and sends the value to the output comparing unit 30.

The state variable managing unit 33 may update a data value indicating the relationship of the amount of protrusion and a read signal with a required amount of heat generating current, for example, on the basis of the result of comparison in the output comparing unit 30 described above as needed or at predetermined timing. By calibrating the state variable table 320 by the state variable managing unit 33 in this way, changes in the relationship between the flying height (the amount of protrusion) and required amount of heat generating current due to changes in the apparatus ambient, for example changes in ambient temperature or atmospheric pressure or aging, can be reliably adapted, and an appropriate flying height can be stably provided during a write and a read operation.

The drive control unit 31 determines a required heat generating current based on the comparing result from the output comparing unit 30 described above, and outputs a control signal for controlling the heating element driver 2003 so that the heating element driver 2003 applies a heat generating current to the heating element 143 for correcting the flying height to a desired value. The drive control unit 31 may receive a required data value in the state variable table 320 from the state variable managing unit 33 and may compare the data value with the comparing result received from the output comparing unit 30 to determine the required value of heat generating current.

The memory unit 32 may be a volatile memory but is preferably a non-volatile memory such as flash memory, EEPROM, or MRAM, from the viewpoint of storing data values.

Figure 4:
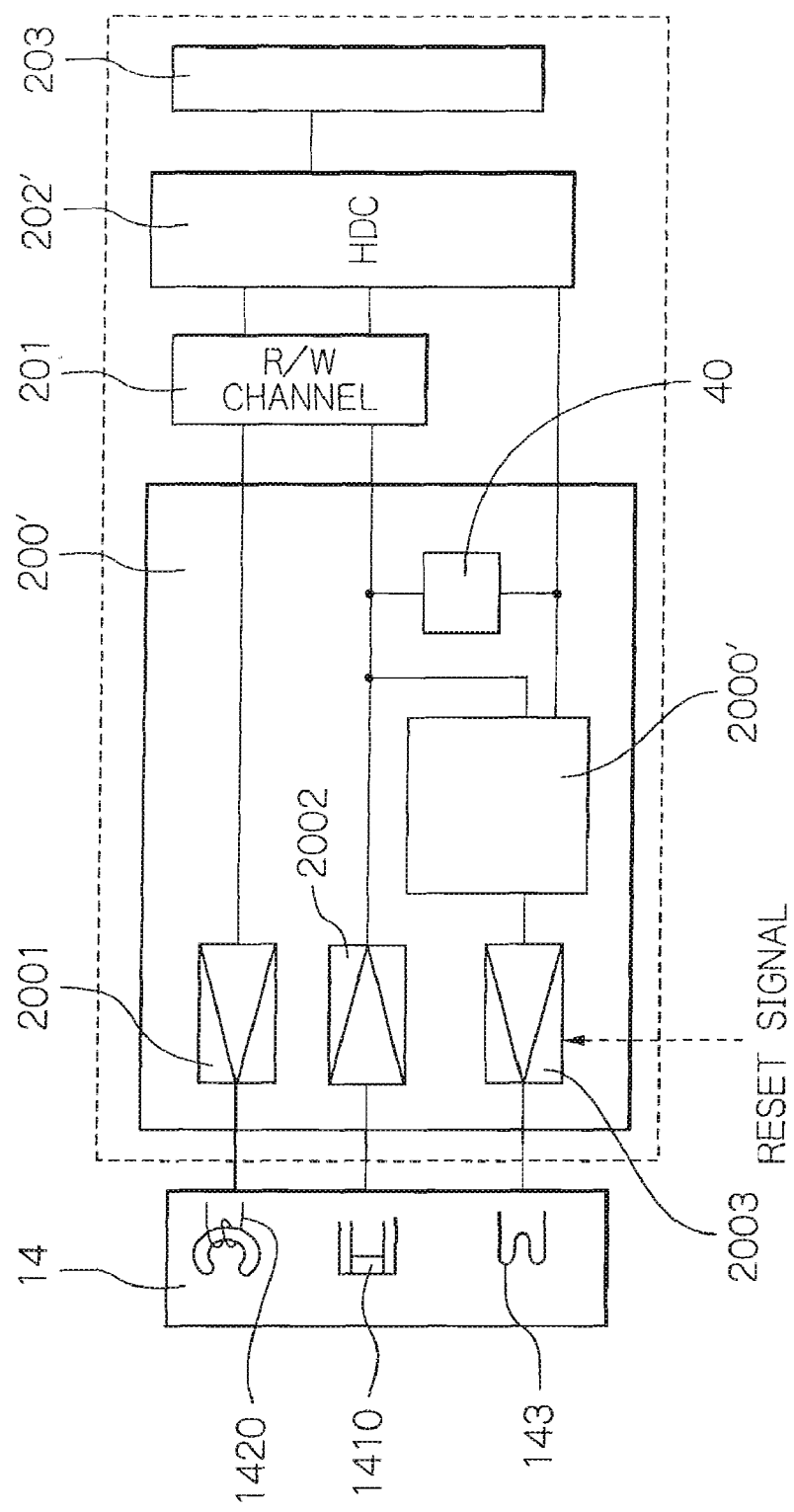
FIG. 4 is a circuit block diagram showing a head amplifier according to a second embodiment of the present invention.

FIG. 4 is a circuit block diagram showing a head amplifier according to a second embodiment of the present invention.

As shown in FIG. 4, a touchdown detecting unit 40, which detects a contact of a magnetic head with a magnetic disk, is provided in the second embodiment. A heat controller 2000' and an HDC 202' receive a touchdown detection signal from the touchdown detecting unit 40. The rest of the configuration of the second embodiment is the same as the first embodiment and therefore the description of which will be omitted.

The term "touchdown" herein refers to an action of intentionally bringing a magnetic head into contact with the surface of a magnetic disk in order to check and adjust the flying height. Touchdown may be made during startup of the apparatus, or when a signal from an impact sensor provided in the apparatus is received, or at predetermined time intervals. Touchdown may be performed, for example, as follows. A reset signal may be sent to the heating element driver 2003. The heating element driver 2003, which has received the reset signal, increases the heat generating current until a touchdown detection signal is output from the touchdown detecting unit 40.

The touchdown detecting unit 40 in FIG. 4 receives a read signal from the read amplifier 2002, detects touchdown (contact) of the head on a magnetic recording medium on the basis of the read signal, and outputs a signal indicating the detection of the touchdown to the heat controller 2000' and an HDC 202' to cause them to respond to the touchdown. Touchdown can be detected based on the read signal, for example, as follows. A baseline shift (thermal asperity) in the read signal is detected and, if the baseline shift continues longer than a predetermined period or is greater than a predetermined amount, it may be determined that a contact has occurred.

Upon receiving the contact detection signal, the heat controller 2000' outputs a control signal to the heating element driver 2003 in order to reduce the current heat generating current to the heating element 143 by a predetermined value. As a result, the amount of heat generated by the heating element 143 decreases by a predetermined amount, and protrusion of the end face of the slider (head element end) is retracted (pushed back) by a predetermined amount. If the flying height at the time point when touchdown occurs is zero, the predetermined retraction amount is equal to the flying height. This flying height can be used subsequently as the target value to control the heat generation. When the HDC 202' receives a contact detection signal, the HDC 202' temporarily halts transmission and reception of a data signal or takes some other action.

The touchdown detecting unit 40 can detect not only touchdown caused by an intentional touchdown operation but also an accidental contact or crash between the head and the magnetic disk surface. If such a contact or crash occurs, for example, a contact detection signal is output in the absence of the reset signal mentioned above. Therefore, it can be recognized that an accidental contact or crash has occurred, and an appropriate action can be taken such as retraction of the head.

The heat controller 2000' may include a state variable table as shown in FIG. 3. In that case, the heat controller 2000' preferably records the read signal as the target value, when push back operation initiated by the touchdown detection signal is completed, and the target value is used in the subsequent control.

As has been described, according to the present invention, touchdown operation can be reliably performed and the flying height can be properly checked and adjusted even with a HDC designed for use in a magnetic recording and reproducing apparatus that does not have a magnetic head with a heating element for flying height adjustment. Furthermore, an accidental contact or crash between a head and a magnetic disk surface can be detected and an appropriate action can be taken.

Figure 5:
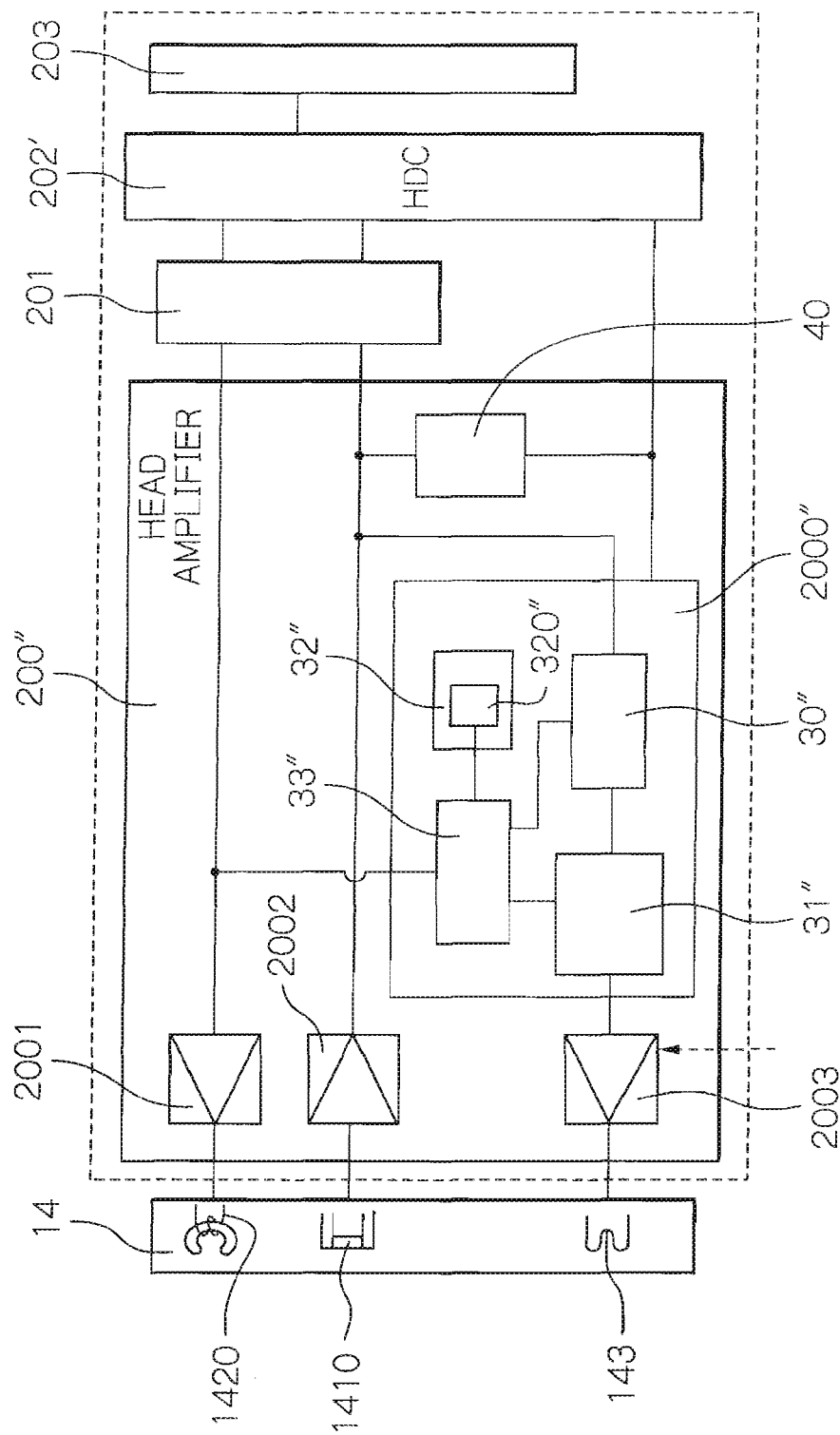
FIG. 5 is a circuit block diagram showing a head amplifier according to a third embodiment of the present invention.

FIG. 5 is a circuit block diagram showing a head amplifier according to a third embodiment of the present invention.

A heat controller 2000" in the third embodiment shown in FIG. 5 has a configuration as shown in FIG. 3, and a state variable managing unit 33" receives a write signal output from an HDC 202' and performs processing according to the write signal. The rest of the configuration of the head amplifier according to the third embodiment is the same as that in the second embodiment and therefore the description of which will be omitted.

In FIG. 5, the state variable managing unit 33" monitors a write signal output from the HDC 202' to a write amplifier 2001. When an output comparing unit 30" requests a data value in a state variable table 320", the state variable managing unit 33" retrieves the data value from the state variable table 320" that corresponds to the write signal it received. For example, the state variable table 320" contains the relationship between the value of the write signal and the amount of protrusion. The state variable managing unit 33" can retrieve and outputs the data value related to the heat generating current that reflects the amount of protrusion caused by the write current to the write head element.

Touchdown detecting unit 40 in the third embodiment has the same or similar functions as the one in the second embodiment. However, the touchdown detecting unit 40 may be omitted.

As has been described, according to the present invention, precise flying height adjustment that reflects the amount of protrusion caused by a write current can be achieved even with a HDC that is designed for use in a magnetic recording and reproducing apparatus that uses a magnetic head without a heating element for flying height adjustment.

Figure 6:
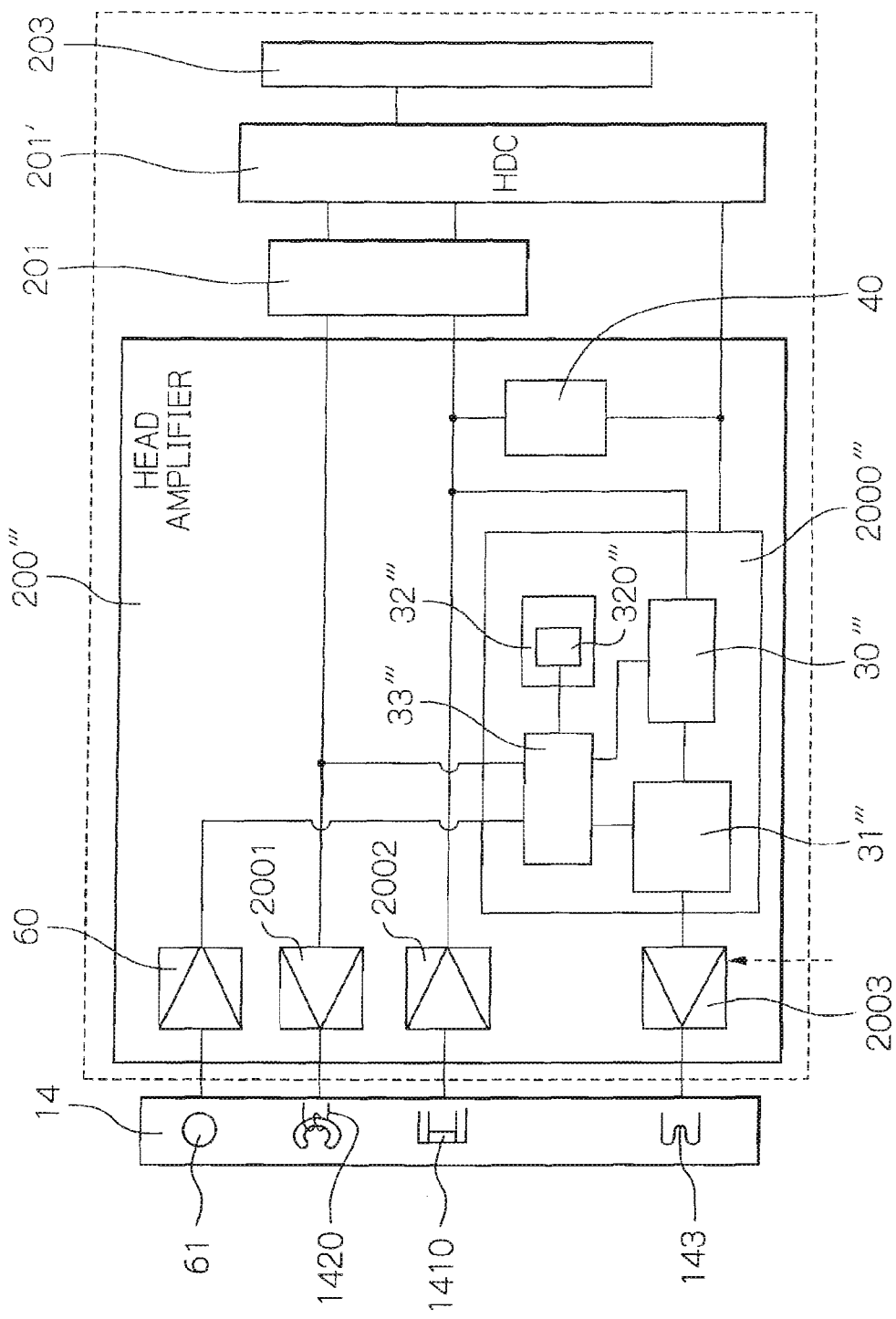
FIG. 6 is a circuit block diagram showing a head amplifier according to a fourth embodiment of the present invention.
Figure 7:
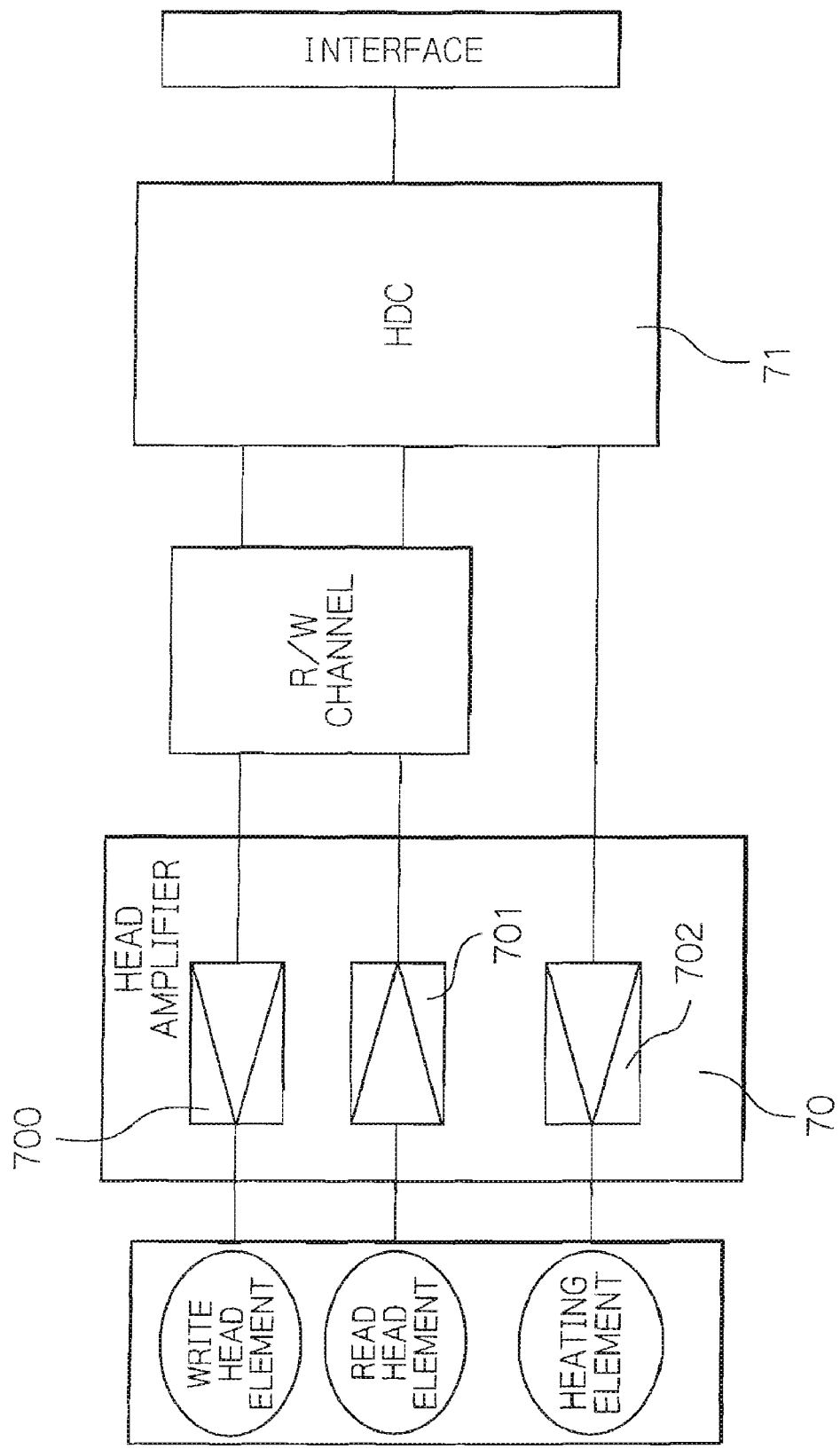
FIG. 7 is a circuit block diagram showing a conventional control circuit of a magnetic recording and reproducing apparatus including a magnetic head with a heating element for flying height adjustment.

FIG. 6 is a circuit block diagram showing a head amplifier according to a fourth embodiment of the present invention.

A heat controller 2000''' in FIG. 6 has a configuration as shown in FIG. 3 and a state variable managing unit 33''' performs processing based on a sensor signal output from a sensor amplifier 60 connected to an ambient sensor element 61 in the fourth embodiment. The rest of the configuration of the head amplifier according to the fourth embodiment is the same as that in the third embodiment and therefore the description of which will be omitted.

In FIG. 6, the ambient sensor element 61, which is provided in a thin-film magnetic head 14, magnetic disk apparatus, or the outside the apparatus, measures ambient conditions such as ambient temperature and atmospheric pressure, and sends sensor output to the sensor amplifier 60 provided in the head amplifier 200'''. Upon reception of the sensor output, the sensor amplifier 60 amplifies the sensor output and outputs a sensor signal to a state variable managing unit 33'''.

When an output comparing unit 30''' requests a data value in a state variable table 320", the state variable managing unit 33''' retrieves the data value from the state variable table 320''' that corresponds to the sensor signal it received. For example, the state variable table 320" contains the relationship between the amount of heat generating current and the amount of protrusion for each ambient temperature and atmospheric pressure, and the state variable managing unit 33''' can retrieve the data value related to the amount of protrusion, which is corresponding to the measured ambient temperature and atmospheric pressure.

Touchdown detecting unit 40 in the fourth embodiment has the same or similar functions as the one in the second embodiment. However, the touchdown detecting unit 40 may be omitted.

As has been described, according to the present invention, precise flying height adjustment that reflects changes in the flying height due to ambient conditions can be achieved even with a HDC that is designed for use in a magnetic recording and reproducing apparatus without heating element for flying height adjustment.

All the embodiments described above are illustrative and not limitative of the present invention. The present invention can be implemented in various other variations and modifications and therefore the scope of the present invention is defined only by the scope of the claims and their equivalents.

The invention claimed is:

1. A head amplifier comprising:
    write amplifying means for applying a write current to a write head element;
    read amplifying means for amplifying a read voltage output from a read head element and outputting a read signal;
    heating element drive means for applying a heat generating current to a heating element for adjusting a flying height; and
    heat control means for controlling the heating element drive means during at least one of a read operation and a write operation, the heat control means comprising:

memory means for storing a state variable table;

state variable managing means for retrieving a required value from the state variable table;

output comparing means for comparing the read signal with a corresponding value in the state variable table and outputting a comparing result; and drive control means for outputting a control signal to the heating element drive means based on the comparing result.

2. The head amplifier according to claim 1, wherein the state variable managing means calibrates the state variable table based on the comparing result.

3. The head amplifier according to claim 1, wherein the state variable managing means reads the corresponding value from the state variable table based on a write signal input into the write amplifying means.

4. The head amplifier according to claim 1, further comprising sensor amplifying means for amplifying a sensor output from an ambient sensor element provided outside the head amplifier and outputting a sensor signal, wherein the state variable managing means reads the corresponding value from the state variable table based on the sensor signal.

5. The head amplifier according to claim 1, wherein the memory means includes a non-volatile memory.

6. A head amplifier comprising:

write amplifying means for applying a write current to a write head element;

read amplifying means for amplifying a read voltage output from a read head element and outputting a read signal;

heating element drive means for applying a heat generating current to a heating element for adjusting a flying height;

heat control means for controlling the heating element drive means during at least one of a read operation and a write operation; and contact detecting means for detecting a contact of a head with a magnetic recording medium based on the read signal and outputting a detection signal indicating the detection of the contact, wherein the heat control means adjusts the heat generating current by controlling the heating element drive means based on the detection signal.

7. A recording and reproducing control circuit comprising:
the head amplifier according to claim 1, and
a controller for providing a write signal to the head amplifier and receiving the read signal from the head amplifier.

8. A magnetic recording and reproducing apparatus comprising:

the recording and reproducing control circuit according to claim 7;

a head gimbal assembly; and a magnetic recording medium, wherein the head gimbal assembly comprises:

a thin-film magnetic head including a write head element which writes a data to the magnetic recording medium, a read head element which reads a data from the magnetic recording medium, and a heating element for adjusting a flying height;

a supporting mechanism for supporting the thin-film magnetic head;

signal lines for the write head element and the read head element; and a lead wire for supplying a heat generating current to the heating element.

9. The magnetic recording and reproducing apparatus according to claim 8, wherein the head amplifier is attached to the supporting mechanism.

10. A recording and reproducing control circuit comprising:

the head amplifier according to claim 6, and a controller for providing a write signal to the head amplifier and receiving the read signal from the head amplifier.

11. A magnetic recording and reproducing apparatus comprising:

the recording and reproducing control circuit according to claim 10;

a head gimbal assembly; and a magnetic recording medium, wherein the head gimbal assembly comprises:

a thin-film magnetic head including a write head element which writes a data to the magnetic recording medium, a read head element which reads a data from the magnetic recording medium, and a heating element for adjusting a flying height;

a supporting mechanism for supporting the thin-film magnetic head;

signal lines for the write head element and the read head element; and a lead wire for supplying a heat generating current to the heating element.

* * * * *